United States Patent
Kolvenbach et al.

(10) Patent No.: US 9,630,053 B2
(45) Date of Patent: Apr. 25, 2017

(54) APPARATUS, IN PARTICULAR FOR BALANCE TRAINING, HAVING AT LEAST ONE MOVEABLE PLATFORM

(71) Applicant: Airbus DS GmbH, Taufkirchen (DE)

(72) Inventors: Hendrik René Kolvenbach, Köln (DE); Ulrich Kübler, Markdorf (DE); Peter Kern, Salem (DE)

(73) Assignee: Airbus DS GmbH, Taufkirchen (DE)

( * ) Notice: Subject to any disclaimer, the term of this patent is extended or adjusted under 35 U.S.C. 154(b) by 0 days.

(21) Appl. No.: 14/438,915

(22) PCT Filed: Oct. 22, 2013

(86) PCT No.: PCT/EP2013/072085
§ 371 (c)(1),
(2) Date: Apr. 28, 2015

(87) PCT Pub. No.: WO2014/075878
PCT Pub. Date: May 22, 2014

(65) Prior Publication Data
US 2015/0251049 A1    Sep. 10, 2015

(30) Foreign Application Priority Data

Nov. 14, 2012    (DE) .......................... 10 2012 110 968

(51) Int. Cl.
*A63B 21/005*    (2006.01)
*A63B 22/16*    (2006.01)
(Continued)

(52) U.S. Cl.
CPC ........ *A63B 22/18* (2013.01); *A63B 21/00076* (2013.01); *A63B 21/00845* (2015.10);
(Continued)

(58) Field of Classification Search
CPC .............. A63B 21/012; A63B 21/4033; A63B 21/00845; A63B 21/4049; A63B 21/4043;
(Continued)

(56) References Cited

U.S. PATENT DOCUMENTS 3,782,721 A * 1/1974 Passera ................ A63B 21/012
482/117
4,867,445 A * 9/1989 Connelly ........... A63B 21/0004
482/113
(Continued)

FOREIGN PATENT DOCUMENTS

AT    502 520 B1    11/2010
DE    195 07 927 A1    9/1996

OTHER PUBLICATIONS

Search Report dated Dec. 1, 2012 issued in corresponding DE patent application No. 10 2012 110 9680 (and partial English translation).
(Continued)

*Primary Examiner* — Joshua Lee
(74) *Attorney, Agent, or Firm* — Posz Law Group, PLC

(57) ABSTRACT

An apparatus, in particular for balance training and/or fine motor training, includes at least one moveable platform, which is in at least two dimensions oscillatingly moveable, and at least one damping unit for a damping of movements of the moveable platform. The damping unit comprises a central connecting element, which extends at least partially along a zero axis of a rest position of the platform, for the connection of the platform and the damping unit and for a transfer of an at least two-dimensional movement of the platform.

16 Claims, 3 Drawing Sheets

Figure 1:
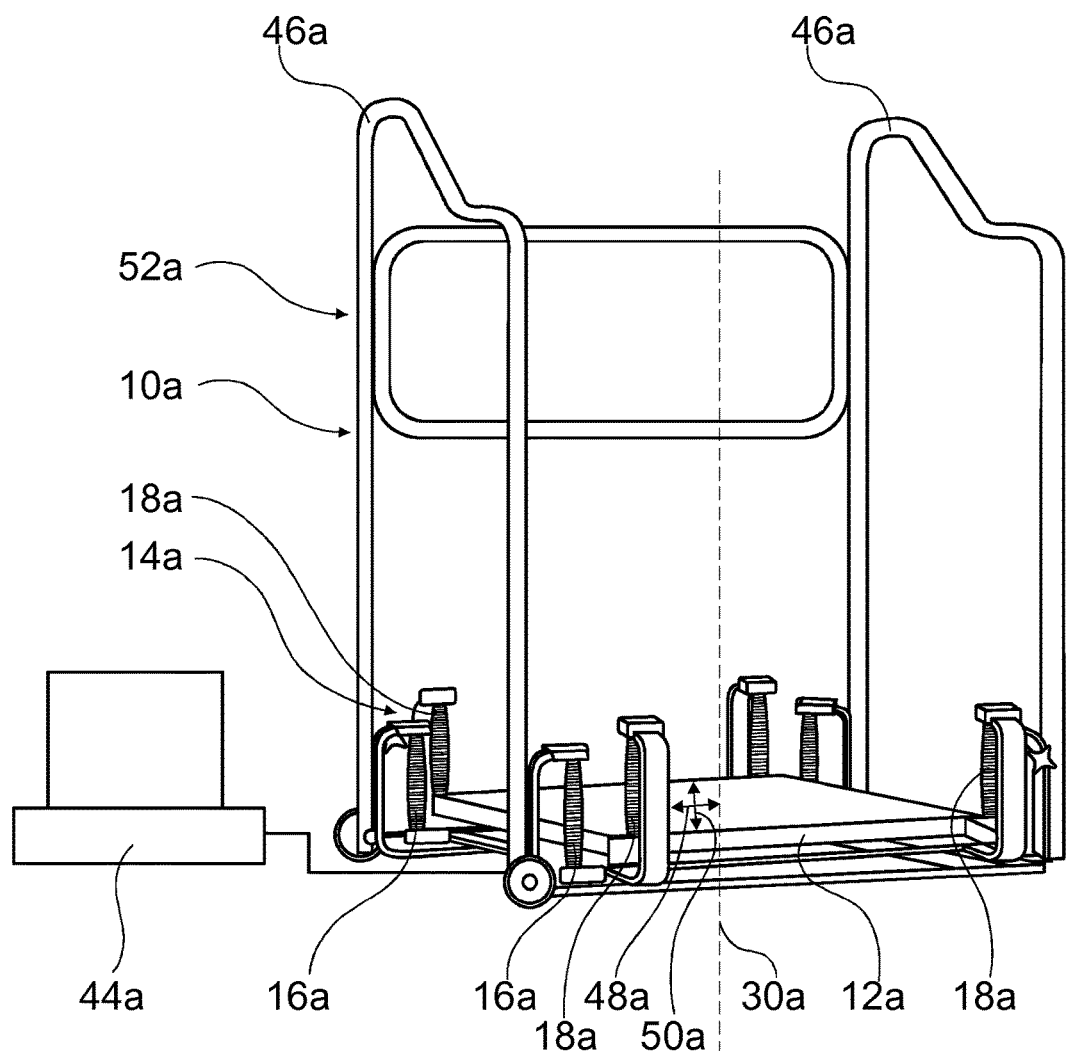

(51) Int. Cl.
*A63B 22/18* (2006.01)
*A63B 21/00* (2006.01)
*A63B 24/00* (2006.01)
*A63F 13/245* (2014.01)
*A63F 13/816* (2014.01)
*A63F 13/24* (2014.01)
*A63B 22/14* (2006.01)
*A63B 21/008* (2006.01)
*A63B 21/012* (2006.01)
*A63B 21/02* (2006.01)
*A63B 26/00* (2006.01)
*A63B 71/00* (2006.01)

(52) U.S. Cl.
CPC ...... *A63B 21/4033* (2015.10); *A63B 21/4043* (2015.10); *A63B 21/4049* (2015.10); *A63B 22/14* (2013.01); *A63B 24/0087* (2013.01); *A63F 13/24* (2014.09); *A63F 13/245* (2014.09); *A63F 13/816* (2014.09); *A63B 21/005* (2013.01); *A63B 21/012* (2013.01); *A63B 21/02* (2013.01); *A63B 2024/0093* (2013.01); *A63B 2026/006* (2013.01); *A63B 2071/0063* (2013.01); *A63B 2220/16* (2013.01); *A63B 2220/806* (2013.01); *A63B 2220/833* (2013.01); *A63B 2220/89* (2013.01)

(58) Field of Classification Search
CPC . A63B 21/00076; A63B 21/005; A63B 21/02; A63B 22/14; A63B 22/18; A63B 24/0087; A63B 2024/0093; A63B 26/00; A63B 26/003; A63B 2026/006; A63B 2071/0063; A63B 2220/16; A63B 2220/89; A63B 2220/833; A63B 2220/806; A63F 13/24; A63F 13/816; A63F 13/245

USPC .................................................... 482/4–6
See application file for complete search history.

(56) References Cited

U.S. PATENT DOCUMENTS

| | | | | |
|---|---|---|---|---|
| 4,880,226 | A * | 11/1989 | Krantz | A63B 21/023 434/253 |
| 5,549,536 | A * | 8/1996 | Clark | A63B 22/14 472/40 |
| 5,820,096 | A * | 10/1998 | Lynch | A63B 21/0004 248/346.01 |
| 6,052,955 | A | 4/2000 | Haider | |
| 6,176,817 | B1 | 1/2001 | Carey et al. | |
| 2004/0198507 | A1 | 10/2004 | Corbalis | |
| 2008/0254958 | A1 | 10/2008 | Ferrara | |
| 2009/0189854 | A1* | 7/2009 | Schwanecke | A63B 21/0004 345/156 |
| 2009/0312165 | A1 | 12/2009 | Rempe | |
| 2011/0039669 | A1* | 2/2011 | Stewart | A63B 21/015 482/146 |
| 2011/0256983 | A1* | 10/2011 | Malack | A61H 1/0266 482/4 |
| 2013/0045812 | A1* | 2/2013 | Garner | A63G 19/20 472/97 |

OTHER PUBLICATIONS

International Search Report and Written Opinion of the International Searching Authority dated Feb. 12, 2013 issued in corresponding International application No. PCT/EP2013/072085 (English translation only).
International Preliminary Report on Patentability dated May 19, 2015 issued in corresponding International application No. PCT/EP2013/072085 (English translation only).
Office Action mailed Aug. 30, 2016 issued in corresponding JP patent application No. 2015-541072 (and English tanslation).

* cited by examiner

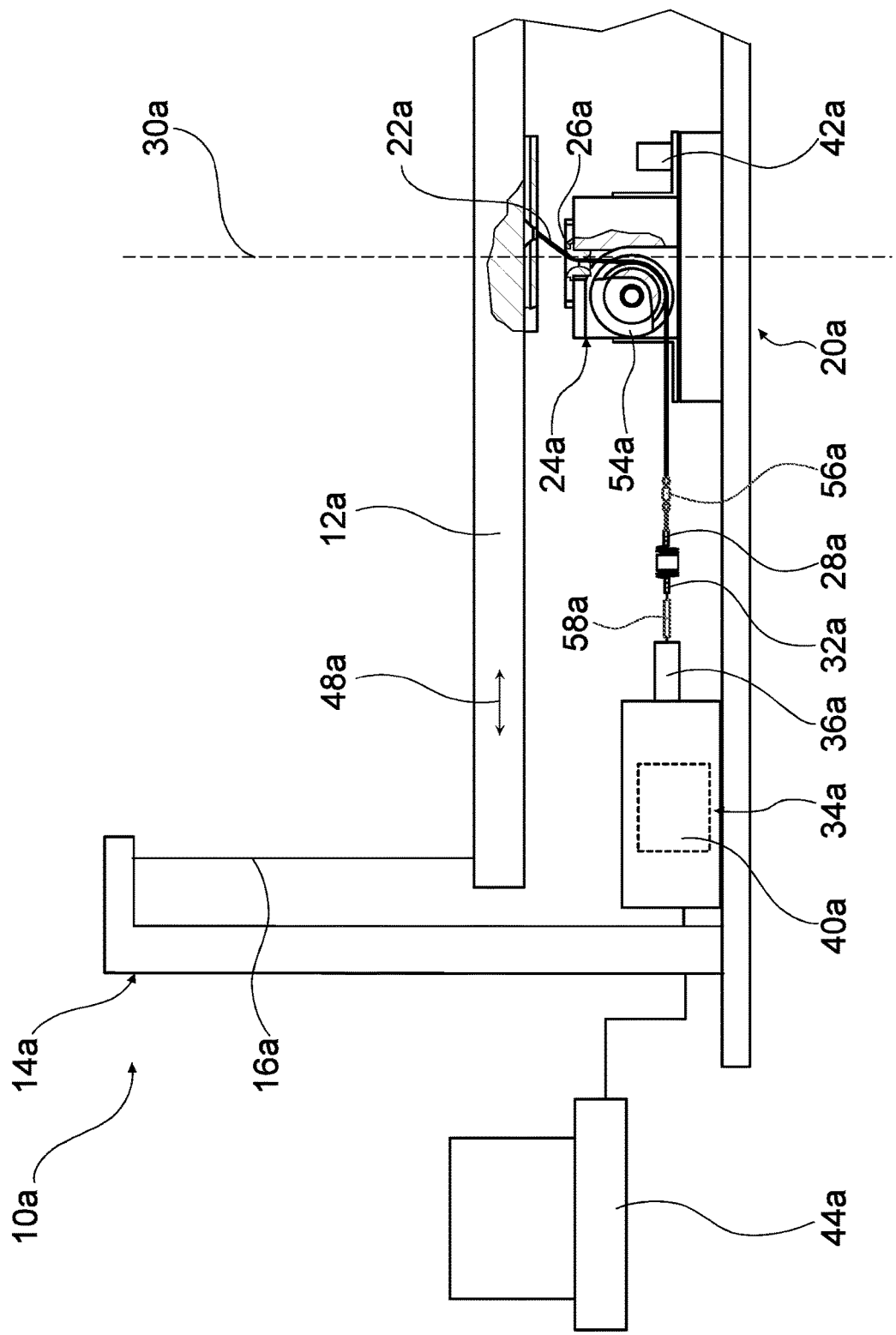

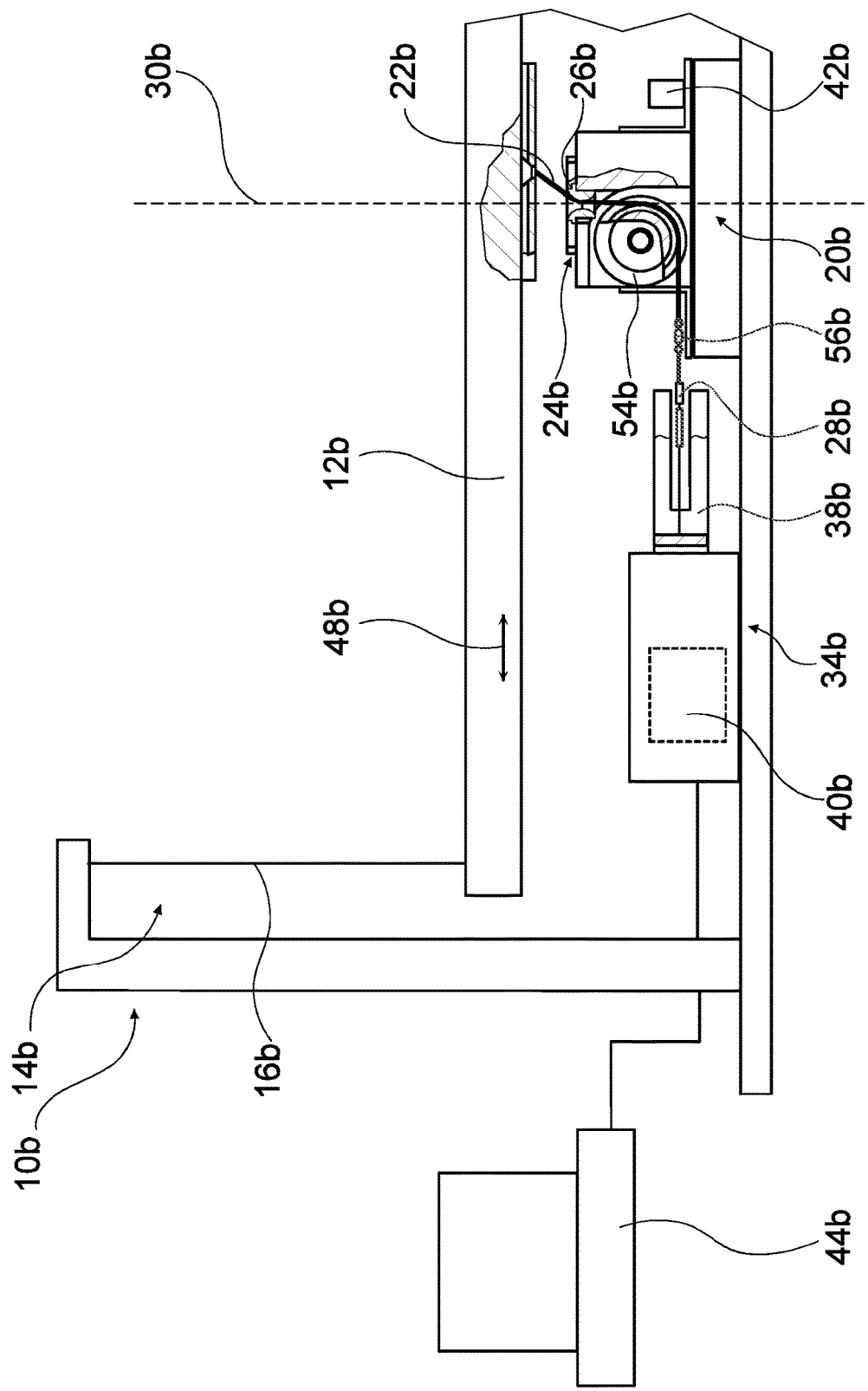

APPARATUS, IN PARTICULAR FOR BALANCE TRAINING, HAVING AT LEAST ONE MOVEABLE PLATFORM

CROSS REFERENCE TO RELATED APPLICATIONS

This application is a U.S. national stage application of PCT/EP2013/072085 filed on Oct. 22, 2013, which is based on German Patent Application No. 10 2012 110 968.2 filed on Nov. 14, 2012, the contents of which are incorporated herein by reference.

STATE OF THE ART

The invention relates to an apparatus according to the preamble of claim 1.

Apparatuses for balance training or fine motor training comprise at least one moveable platform, which is oscillatingly moveable in at least two dimensions. Apparatuses with damper elements for a damping of movements of the moveable platform are known, which are embodied, for example, as plastic-shelled steel ropes fastening the platform such that it is pending and having a damping effect due to material characteristics of the plastic shell. The known damper elements are only rather roughly adjustable, and a modification of damping characteristics during operation of the apparatus is not possible.

The objective of the invention is, in particular, to provide a generic device with improved features regarding an adjustability of a damping. The objective is achieved according to the invention by the features of patent claim 1, while advantageous implementations and further developments of the invention may be gathered from the subclaims.

ADVANTAGES OF THE INVENTION

The invention is based on an apparatus, in particular for balance training and/or fine motor training, with at least one moveable platform, which is oscillatingly moveable in at least two dimensions, with at least one damping unit for a damping of movements of the moveable platform. A "moveable platform, which is oscillatingly moveable in at least two dimensions" is to be understood, in particular, as a platform, preferably a planar platform, which is supported in such a way, e.g. by means of a suspension on a framework, that it is deflectable within a predetermined deflection range at least along two directions running perpendicularly to each other in a plane, preferably a plane that is parallel to a ground which the apparatus is set up on, and that is provided with a reset of the deflection to a rest position. In particular, in addition to the deflection in two directions in the plane, the moveable platform can be also pitched in a direction perpendicularly to the plane or the moveable platform can be three-dimensionally deflected, without a translational movement, by roll and yaw angles. The platform comprises a standing surface, onto which a person stands who deflects the platform by his own movements and/or counteracts a deflection of the platform by an external instigation. Preferably the standing surface is implemented planar, but can principally also be implemented such that it is curved or has another basic shape differing from a planar surface, e.g. a hemisphere shape. The apparatus is in particular provided for a utilization in a training for strengthening the sense of balance or for a therapy of disorders of the sense of balance. By a "damping unit for a damping of movements of the moveable platform" is to be understood, in particular, a unit which is provided to damp a force that results in a deflection of the platform and to thus exert a certain resistance counter to a deflection of the platform.

It is proposed that the damping unit comprises a central connecting element, which at least partially extends along a zero axis of a rest position of the platform, for connecting the platform and the damping unit and for a transfer of an at least two-dimensional movement of the platform. By a "zero axis of a rest position of the platform" is to be understood, in particular, an axis that stands perpendicularly on a plane of the platform and extends in a rest position of the platform through a geometrical center of the platform. A "connecting element" is to be understood, in particular, as an element which is provided to transfer a deflection of the platform out of its rest position to at least one further element. Preferably the connecting element is embodied as a pliable element. By a "central connecting element" is to be understood, in particular, that the connecting element is arranged at least in a region near the zero axis of the rest position of the platform and that the connecting element converts deflections of the platform having the same absolute value in directions that are opposite each other, into an identical deflection. In particular, a damping of movements of the platform due to a damping of a movement of the central connecting element can be effected by means of the central connecting element. In particular, the central connecting element is provided to one-dimensionally transfer the at least two-dimensional movement to the damping unit. In particular, a reduction of a number of damper elements required for a damping of movements of the platform is achievable.

Furthermore, it is proposed that the central connecting element one-dimensionally transfers the at least two-dimensional movement of the platform to the damping unit. In particular, a reduction of a number of damper elements of the damping unit is achievable.

It is further proposed that the damping unit comprises at least one movement con-version unit, which converts a rotary component of the at least two-dimensional movement of the platform into a rotary movement of the central connecting element about its axis. In particular, an absolute value of a translational deflection of the platform out of its rest position remains as a deflection of the central connecting element. In particular, the rotary component of the movement of the platform is converted into a rotary component of a movement of the central connecting element in a partial region of the connecting element, which partial region is arranged between the moveable platform and the movement conversion unit, and said rotary component of the movement of the central connecting element is converted into a rotary movement of the central connecting element about its axis. In particular, the at least two-dimensional movement of the platform is thus converted into a one-dimensional movement of the central connecting element. A "movement conversion unit" is to be understood, in particular, as a unit which is provided to convert a movement in a rotary or translational direction into a movement in a different rotary or translational direction. Preferably the movement conversion unit is provided to reduce a dimensionality of a movement, for example by a two-dimensional movement with a rotary component being converted into a merely translational movement in one dimension. Preferentially the movement conversion unit comprises an element about which the central connecting element can rotate to convert the rotary component of the movement into a rotation about the axis of the central connecting element. In particular, a reduction of a number of required damper elements can be achieved in that only a damping of the translational deflection of the platform out of its rest position has to be effected.

Moreover it is proposed that the motion conversion unit comprises a sleeve or a bore having a rounded opening. In particular, the sleeve or bore having a rounded opening is provided to convert a rotary component of a movement of the central connecting element into a rotation of the central connecting element about its axis, by way of the central connecting element rotating about a contact point with the sleeve or bore at the rounded opening. Principally, in alternative embodiments the opening can be implemented as a sharp-edged instead of a rounded opening. In particular, a constructively simple movement conversion unit is achievable.

It is further proposed that the central connecting element is at least partially implemented as a rope element. A "rope element" is to be understood, in particular, as a pliable, lengthy element consisting of natural or synthetic fibers or of metal wires, the fibers or wires being twisted, which element is provided for a transfer of traction forces. The rope element is in particular embodied as a steel rope made of steel wires. In particular, a rope element can comprise a coating, a sleeve or a shell made of an identical or a different material as regards a material of the fibers or wires. Principally, the central connecting element can be implemented at least partially as a chain element. In particular, an easily producible, low-price central connecting element is achievable.

It is moreover proposed that the damping unit comprises at least one spring element. By a "spring element" in particular a macroscopic element is to be understood which, in a normal operation state, is elastically modifiable at least in length by no less than 10%, in particular by at least 20%, preferably by no less than 30% and especially advantageously by at least 50%, and which in particular generates a counterforce that depends on a change of the length and is preferably proportional to the change and acts counter to the change. A "length" of an element is intended to mean, in particular, a maximum distance of two points of a perpendicular projection of the element on a plane. A "macroscopic element" is to mean, in particular, an element with an extension of at least 1 mm, in particular at least 5 mm, preferably at least 10 mm and particularly preferably at least 50 mm. In particular, the spring element is connected to the central connecting element and exerts a resistance depending on a pre-bias counter to a deflection of the central deflection element, as a result of which deflections are damped in one direction. The spring element can be embodied as a linear-elastically deformable element or as a torsion spring element. Principally, the damping unit can comprise instead of or in addition to a spring element an additional damper element, which can be arranged in the damping unit in series or in parallel with the spring element. It is also principally conceivable to use a number of groups of spring elements that are arranged in parallel with each other and of additional damper elements, the number of groups being connected in parallel and/or in series with each other. The additional damper element can be implemented as an element with internal damping properties, e.g. a rubber rope or a braided rubber rope with a non-linear load characteristic. The additional damper element can be embodied such that it is integrated with the spring element. In particular, a damping unit is achievable that is embodied in a constructively simple manner.

Furthermore, an untwisting unit for a connection of the central connecting element and the spring element is proposed, which allows a rotation of the central connecting element about its axis. An "untwisting unit" is to be understood, in particular, as a unit which is fastened, at one end, to an element, in particular to the central connecting element, and which allows a rotation of the element about its axis within the element, wherein the rotation of the element is converted into an internal rotation of the untwisting unit. In particular, a constructively simple connection of the central connecting element and the spring element is achievable.

Moreover an adjustment unit is proposed, which is provided for an adjustment of a damping degree. An "adjustment unit" is to be understood, in particular, as a unit which acts onto the damping unit, in a manual or in an electronically controlled manner, changing a damping degree of the damping unit and thus the potential range of motion of the platform for a given deflection force. Preferably the adjustment unit is provided to change the damping degree during operation of the apparatus. In particular, an apparatus is achievable which can be flexibly adapted to different conditions.

It is also proposed that the adjustment unit comprises an electric actuator. By an "electric actuator" in particular a mechatronic structural element is to be understood, which is provided to convert electric signals into a movement, in particular into a linear movement. In particular, the electric actuator is provided to adjust a pre-bias of the spring element. In particular, the actuator is provided for a continuous adjustment of the pre-bias. In particular, a cost-effectively realizable and simply actuable, continuously variable adjustment unit is achievable.

Further it is proposed that the damping unit comprises a directly adjustable damper element. A "directly adjustable damper element" is to be understood, in particular, as a damper element the damping degree of which can be adjusted by a direct electric actuation, in particular without previous actuation of an actuator for adapting a pre-bias, or by applying an external electric and/or magnetic field. In alternative embodiments the damping unit can also comprise, instead of or in addition to a directly adjustable damper element and/or spring element, an eddy-current brake or a friction brake. In particular, a continuously variable and quickly effected adjustment of a damping degree is achievable in a constructively simple manner.

It is moreover proposed that the directly adjustable damper element is implemented as an electro-rheological damper and/or a magneto-rheological damper. An "electro-rheological damper" is to be understood, in particular, as a damper with an electro-rheological liquid. An "electro-rheological liquid" is to be understood, in particular, as a liquid in which electrically polarizable particles are suspended and which has a viscosity that can be modified by applying an electric field due to dipoles being formed from the particles. A "magneto-rheological damper" is to be understood, in particular, as a damper with a magneto-rheological liquid. A "magneto-rheological liquid" is to be understood in particular as a liquid in which magnetically polarizable particles are suspended and which can be modified by applying a magnetic field. In particular, a constructively simple and directly adjustable damper element can be achieved.

Furthermore, it is proposed that the adjustment unit comprises a control unit. A "control unit" is to be understood, in particular, as a unit which comprises at least one computing unit and at least one storage unit and which is provided to execute at least one program that is stored in the storage unit and preferably to effect an adjustment of the damping degree in dependence of the stored program and/or of a movement of the platform. An apparatus is in particular achievable which can be adapted to different possible requirements easily and quickly, and which in particular can be combined with further, external apparatuses, e.g. a video gaming console.

Moreover it is proposed that the control unit is provided to adjust the damping degree in dependence on measurement values of at least one sensor for measuring a deflection of the platform. The sensor can, for example, be implemented as a camera, as an induction sensor or as a further sensor for a position measurement which is deemed suitable by a person having ordinary skill in the art. In particular, a flexibly adaptable device can be achieved.

It is further proposed that the control unit is provided for executing a training program, in which a slow reduction of the damping degree of the damping unit due to an increase of a deflection amplitude of the platform is superimposed by a quick raising of the damping degree. By a "slow reduction" and a "quick raising" of the damping degree is to be understood, in particular, that the reduction of the damping degree occurs slowly with respect to the raising of the damping degree. By an "increase of a deflection amplitude" is to be understood, in particular, that due to a decline of the damping degree and/or due to movements of a person on the platform, e.g. compensating movements of the person in case of an external instigation, an amplitude of deflections of the platform out of its rest position increases. Preferably an increase of the deflection amplitude of the platform is determined by the computing unit of the control unit. In particular, the quick raising of the damping degree is provided to avoid an overlarge increase of the deflection amplitude of the platform. In particular, the slow reduction of the damping degree is provided to recurrently challenge the person anew in the course of the training program by a gradual increase of a deflection amplitude of a same movement of the person on the platform, thus achieving a high-level training effect. In particular, stability and motor abilities of a person undergoing the training program can be easily and reliably determined and exercised by a slow reduction of the damping degree and a therefrom resulting increase of a deflection of the platform caused by movements of the person. In particular, a training program with a huge, person-specifically adapted stability is achievable.

Moreover it is proposed that the central connecting element is provided for a damping of the movement of the platform by means of an external friction. By an "external friction" is to be understood, in particular, a friction of the central connecting element with a further structural element of the apparatus that is different from the central connecting element. In particular, the central connecting element is provided to rub, in accordance with the Euler-Eytelwein equation, with a surface of the sleeve or bore having a rounded opening and to dissipatively convert kinetic energy into heat energy. An additional damping of movements of the moveable platform is in particular achievable.

The apparatus according to the invention is in particular provided to be utilized for a balance training and/or for therapy. In the therapy the apparatus according to the invention can be applied, for example, for muscle training.

Further a utilization of the apparatus according to the invention under reduced-gravity conditions for a balance training and/or fine motor training and/or for therapy is proposed. By "reduced-gravity conditions" in particular conditions are to be understood, under which there is a gravity effect of maximally 0.9 g, advantageously no more than $1*10^{-3}$ g, preferably maximally $1*10^{-6}$ g and particularly preferably maximally $1*10^{-8}$ g. The gravity effect can be generated by gravitation and/or artificially by an acceleration. The value of the acceleration by free fall on Earth, i.e. 9.81 m/s², is designated by "g". In particular, a training possibility under reduced-gravity conditions that is easily adaptable to individual requirements can be provided.

Moreover a utilization of the apparatus according to the invention acting together with a gaming console is proposed. Preferably the apparatus according to the invention comprises a control unit that is connected to the gaming console, which may either be integrated in the gaming console or be embodied separately from the gaming console. In particular, the control unit that is connected to the gaming console is implemented by the control unit of the adjustment unit.

Furthermore a utilization of the apparatus according to the invention acting together with a gaming console under reduced-gravity conditions is proposed.

Further a utilization of the apparatus according to the invention is proposed, wherein a slow reduction of the damping degree of the damping unit is superimposed by a quick raising of the damping degree due to an increase of a deflection amplitude of the platform. In particular, a training program with a high-level, person-specifically adapted stability can be achieved.

The apparatus according to the invention is herein not to be restricted to the application and implementation form described above. In particular, the apparatus according to the invention can comprise, for fulfilling a functionality herein described, a number of individual elements, components and units that differs from a number herein mentioned.

DRAWINGS

Further advantages may be gathered from the following description of the drawings. In the drawings two exemplary embodiments of the invention are presented. The drawings, the description and the claims contain a plurality of features in combination. The person having ordinary skill in the art will purposfully also consider the features separately and will further combine them in expedient ways.

It is shown in:

FIG. 1 a schematic presentation of an apparatus according to the invention seen obliquely from above, FIG. 2 a schematic view of a damping unit of the apparatus according to the invention, with a spring and an actuator, and FIG. 3 a schematic view of an alternative device with a damping unit comprising a directly adjustable damper element.

DESCRIPTION OF THE EXEMPLARY EMBODIMENTS

FIG. 1 shows an apparatus 10a according to the invention for balance training, with a moveable platform 12a that is oscillatingly moveable in at least two dimensions, with a damping unit 20a for damping movements of the moveable platform 12a seen obliquely from above. The moveable platform 12a is oscillatingly supported at a frame 52a, which can be made, for example, of aluminium, by means of suspension elements 16a, 18a of a suspension unit 14a, wherein the suspension elements 16a provide a support in a movement direction 48a of the moveable platform 12a, and the suspension elements 18a provide a support in a movement direction 50a of the moveable platform 12a, which is perpendicular to the movement direction 48a of the moveable platform 12a. The suspension elements 16a, 18a are herein implemented as plastic-shelled steel ropes effecting via a deformation of a material of a plastic shell an additional damping of the movement. The frame 52a comprises two handles 46a, which are provided in particular as a mounting aid. The platform 12a is deflectable in two movement directions 48a, 50a and is thus deflectable two-dimensionally. In alternative embodiments, the platform 12a can additionally be implemented such that it is also tiltable. The apparatus 10a is provided for a utilization in a balance training in a therapy, and is further provided to be applied such that it is acting together with a gaming console 44a. By acting together with the gaming console 44a in particular a simulation of different conditions, e.g. for a training, is rendered possible. A utilization of the apparatus 10a can also take place under reduced-gravity conditions, e.g. on board a space station or a space capsule or on a moon, planet or asteroid, to the purpose of astronauts' training measures for muscle building. The moveable platform 12a of the apparatus 10a is deflected by movements of a person standing on a planar surface of the platform 12a, wherein in alternative embodiments a surface of the platform 12a may also have a shape differing from a planar implementation. Furthermore the moveable platform 12a can, in alternative embodiments, be set into motion by a deflection by means of a deflecting unit, e.g. an attached excenter motor, wherein the person standing on the surface has to compensate the movement caused by the deflecting unit for achieving a training effect.

The damping unit 20a (FIG. 2) comprises a central connecting element 22a, which extends partially along a zero axis 30a of a rest position of the platform 12a, for connecting the platform 12a and the damping unit 20a, and for a transfer of an at least two-dimensional movement of the platform 12a. The central connecting element 22a is embodied as a rope element. The rope element is embodied by a steel rope, in alternatively implemented versions the central connecting element 22a may be implemented by a rope element made of a material different from steel and may comprise, for example, a coating or the central connecting element 22a can at least partially be implemented as a chain.

The central connecting element 22a one-dimensionally transfers the at least two-dimensional movement of the platform 12a onto the damping unit 20a. The damping unit 20a comprises a motion conversion unit 24a, which converts a rotary component of the at least two-dimensional movement of the platform 12a into a rotary movement of the central connecting element 22a about its axis. The motion conversion unit 24a comprises in a body a bore 26a with a rounded opening. In an alternative embodiment the motion conversion unit 24a may comprise in a body, instead of a bore, a sleeve with a rounded opening. Principally it is also conceivable that the bore 26a or the sleeve has a sharp-edged opening. The central connecting element 22a is guided through the bore 26a, resting against the opening. In a deflection of the platform 12a out of its rest position, the translational component of the deflection and thus of the movement of the platform 12a is converted into a translational movement of the central connecting element 22a, while a rotary component of the movement is converted into a rotation of a partial region of the central connecting element 22a between the bore 26a and the platform 12a about the bore 26a of the motion conversion unit 24a and, in case of a multiple rotation about the bore 26a, into a rotation of the central connecting element 22a about its axis. Thus the rotary component of the movement of the platform 12a is filtered out and merely an absolute value of the deflection out of its rest position remains for a damping by the damping unit 20a. Principally it is conceivable to provide separate dampings for each one of the two movement directions 48a, 50a of the platform 12a and to provide, instead of the central connecting element 22a, different elements for a connection to the separate dampings.

The damping unit 20a comprises a spring element 32a, which is connected to the central connecting element 22a and which exerts, due to a restoring force, a resistance counter to a translational movement of the central connecting element 22a, such that a deflection of the platform 12a is damped via the central connecting element 22a. An additional damper element 58a of the damping unit 20a is arranged in series with the spring element 32a. The additional damper element 58a is embodied as a braided rubber rope with a non-linear load characteristic. In alternative implementations of the damping unit 20a, the additional damper element 58a of the damping unit 20a can be arranged in parallel with the spring element 32a. The central connecting element 22a is further provided for a damping of the movement of the platform 12a by means of external friction, due to the central connecting element 22a rubbing in a translational movement with the surface of the bore 26a in accordance with the Euler-Eytelwein equation and kinetic energy of the central connecting element 22a and thus of the platform 12a being dissipated in this external friction, as a result of which the movement of the platform 12a is damped. In particular, the external friction of the central connecting element 22a with the surface of the bore 26a is provided for a damping of a reverberation of the platform 12a in a deflection, and of movements caused by a person mounting. In the exemplary embodiment shown both the central connecting element 22a and the surface of the rounded opening of the bore 26a are made of steel, principally however, both the central connecting element 22a and the surface of the rounded opening of the bore 26a can be made of other materials. On a distance between the bore 26a and the spring element 32a, the central connecting element 22a is deflected by means of a pulley 54a. The apparatus 10a comprises an untwisting unit 56a implemented by a turbulence bearing for connecting the central connecting element 22a and the spring element 32a, which allows a rotation of the central connecting element 22a about its axis, such that a force impact onto the spring element 32a is avoided by the rotation of the connecting element 22a about its axis, and the spring element 32a is merely charged with a force impact due to the absolute value of the deflection of the platform 12a out of its rest position. The untwisting unit 56a implemented by the turbulence bearing is connected to the spring element 32a via a sleeve element 28a. It is conceivable, in alternative embodiments, that the damping unit 20a comprises in addition to or instead of the spring element 32a for example an eddy-current brake or a friction brake to the purpose of damping.

An adjustment unit 34a is provided for an adjustment of a damping degree of the damping unit 20a. The adjustment unit 34a comprises an electric actuator 36a, which adjusts a pre-bias force of the spring element 32a. Via an adjustment of the pre-bias force of the spring element 32a by the actuator 36a, the damping degree of the damping unit 20a is adjusted as, on the one hand, due to an increased pre-bias force a greater counterforce is exerted counter to a deflection of the central connecting element 22a by the platform 12a and, on the other hand, due to a change in a force onto the central connecting element 22a, a change in a friction force with the surface of the bore 26a is achieved in accordance with the Euler-Eytelwein equation. The adjustment unit 34a comprises a control unit 40a, which is integrated in the adjustment unit 34a and comprises a computing unit and a storage unit with programs stored therein. The control unit 40a is provided to actuate the actuator 36a for an adaption of the damping. In particular, to the purpose of adapting the apparatus 10a to different requirements of users of the apparatus 10a, e.g. to different degrees of balance impairment of different persons carrying out a balance training in a therapy, different damping degrees can be set. Due to the electric actuator 36a an adjustment of the damping degree can be effected in a continuously variable manner. The control unit 40a has stored in its storage unit in particular different trainings programs with different levels of difficulty, which are realized via different damping degrees, wherein the level of difficulty changes in some of the training programs in the course of an execution of the training program. In particular, by means of the adjustment unit 34a, via the control unit 40a and the electric actuator 36a an adjustment and adaptation of the damping degrees can be carried out during a use of the apparatus 10a, thus allowing a realization of training programs having different damping degrees, and thus levels of difficulty, without interrupting the training program for adapting the damping degree. The control unit 40a is provided to execute a trainings program, in which a slow reduction of the damping degree of the damping unit 20a due to an increase of a deflection amplitude of the platform 12a is superimposed by a quick raising of the damping degree. The quick raising of the damping degree serves to avoid an overlarge increase of the deflection amplitude of the platform 12a, while by the slow reduction of the damping degree in the course of the training program by a gradual increase of a deflection amplitude in a same movement of a person on the platform 12a, the person is recurrently challenged anew in the course of the training program, as a result of which a high-level training effect is achieved. In particular, the training program comprises a start stage with a high damping degree, in which movements of the person on the platform 12a only result in a slight deflection of the platform 12a. After the start stage, due to the slow reduction of the damping degree of the damping unit 20a, there is a transition into an actual training stage, in which an increase of the deflection amplitude of the platform 12a, which results from the reduction of the damping degree of the damping unit 20a, is actuated by the control unit 40a to the purpose of a quick raising of the damping degree and is superimposed onto the slow reduction of the damping degree, resulting in quickly changing training conditions by which a high-level training effect is achieved.

It is further possible, acting together with the gaming console 44a, by means of the control unit 40a, to simulate at the gaming console 44a different situations for training games by different damping degrees, e.g. for training astronauts. In alternative embodiments the control unit 40a can be integrated in the gaming console 44a, such that an actuation of the adjustment unit 34a can be effected via the gaming console 44a. Furthermore, alternative embodiments are conceivable in which an adaptation of the damping degree is effected manually at the spring element 32a. The control unit 40a is provided to adjust the damping degree in dependency on measurement values of at least one sensor 42a for measuring a deflection of the platform 12a. The sensor 42a is implemented by a camera, via which the control unit 40a gets the movement of the platform 12a, on the basis of a detection of markings at an underside of the platform 12a. In alternative embodiments the sensor 42a for measuring a position of the platform 12a can be embodied by other sensors 42a deemed expedient by a person skilled in the art.

In FIG. 3 another exemplary embodiment of the invention is shown. The following descriptions and the drawing are limited substantially to the differences between the exemplary embodiments, wherein regarding identically designated components, in particular components with the same reference numerals, the drawings and/or the description of the other exemplary embodiments, in particular of FIGS. 1 and 2, may be referred to. To the purpose of distinguishing the exemplary embodiments, the letter a is put after the reference numerals of the exemplary embodiment in FIGS. 1 and 2. In the exemplary embodiments of FIG. 3 the letter a is substituted by the letter b.

An alternative device 10b for balance training, with a moveable platform 12b which is oscillatingly moveable in at least two dimensions and with a damping unit 20b for a damping of movements of the moveable platform 12b, is embodied in a manner substantially analogous to the previous exemplary embodiment (FIG. 3). The damping unit 20b of the apparatus 10b comprises a directly adjustable damper element, which is implemented by an electro-rheological damper 38b. The electro-rheological damper 38b is implemented such that it is substantially analogous to a regular shock absorber and comprises a filling with a liquid into which a suspension of particles has been introduced, in which particles dipoles are induced by applying an electric field. By the induction of dipoles an arrangement of the particles in chains is effected, as a result of which a viscosity of the liquid and thus a damping degree of the damping unit 20b is changed. The electric field is generated by an adjustment unit 34b, which regulates the damping degree via the electric field. The adjustment unit 34b comprises a control unit 40b that actuates a generating of the electric field. Via the generating of the electric field the damping degree can be adjusted dynamically and continuously, an adaptation being also achievable during a use of the apparatus 10b. In particular, the control unit 40b can induce, on its own or acting together with a gaming console 44b, execution of at least one training program in which the damping degree is adapted during the training program. In alternative embodiments of the apparatus 10b the directly adjustable damper element of the damping unit 20b can be implemented, for example, as a magneto-rheological damper. The control unit 40b is provided to execute a training program, in which a slow reduction of the damping degree of the damping unit 20b due to an increase of a deflection amplitude of the platform 12b is superimposed by a quick raising of the damping degree.

REFERENCE NUMERALS 10 device
12 platform
14 suspension unit
16 suspension element
18 suspension element
20 damping unit
22 connecting element
24 motion conversion unit
26 bore
28 sleeve element
30 zero axis
32 spring element
34 adjustment unit
36 actuator
38 electro-rheological damper
40 control unit
42 sensor
44 gaming console
46 handle 48 movement direction
50 movement direction
52 frame
54 pulley
56 untwisting unit
58 additional damper element

The invention claimed is:

1. An apparatus, in particular for balance training and/or fine motor training, comprising:
   at least one moveable platform, which is in at least two dimensions oscillatingly moveable, and
   at least one damping unit for a damping of movements of the moveable platform, the damping unit comprises a central connecting element that extends from the moveable platform to the damping unit,
   wherein the damping unit comprises at least one motion conversion unit, which converts a rotary component of the at least two-dimensional movement of the moveable platform into a rotary movement of the central connecting element about its axis,
   wherein the motion conversion unit comprises a sleeve or a bore with a rounded opening, and
   an adjustment unit that is provided for an adjustment of a damping degree and that comprises a control unit provided to adjust the damping degree in dependence on measurement values of at least one sensor for measuring a deflection of the moveable platform,
   wherein the damping degree of the damping unit is adjusted via an adjustment of a pre-bias force of a spring element by an actuator, as, due to (i) an increased pre-bias force, a greater counterforce is exerted counter to a deflection of the central connecting element by the moveable platform and, due to (ii) a change in a force onto the central connecting element, a change in a friction force with a surface of the sleeve or the bore is achieved.

2. The apparatus according to claim 1, wherein the central connecting element is at least partially implemented as a rope element.

3. The apparatus according to claim 1, wherein the damping unit comprises at least one spring element.

4. The apparatus according to claim 3, comprising a sleeve element for a connection of the central connecting element and the spring element, which sleeve element allows a rotation of the central connecting element about its axis.

5. The apparatus according to claim 1, wherein the adjustment unit comprises an electric actuator.

6. The apparatus according to claim 1, wherein the damping unit comprises a directly adjustable damper element.

7. The apparatus according to claim 6, wherein the directly adjustable damper element is implemented as an electro-rheological damper and/or as a magneto-rheological damper.

8. The apparatus according to claim 1, wherein the control unit is provided for carrying out a training program, by a slow reduction of the damping degree of the damping unit, which is superimposed by a quick raising of the damping degree due to an increase of a deflection amplitude of the moveable platform.

9. The apparatus according to claim 1, wherein the central connecting element is provided for a damping of the movement of the moveable platform by external friction.

10. A method of utilizing an apparatus according to claim 1, comprising utilizing the apparatus for balance training and/or fine motor training and/or for therapy.

11. The method according to claim 10, further comprising utilizing the apparatus under reduced gravity conditions.

12. A method of utilizing an apparatus according to claim 1, together with a gaming console.

13. The method according to claim 12, further comprising utilizing the apparatus and gaming console under reduced gravity conditions.

14. The method according to claim 10, further comprising superimposing a slow reduction of the damping degree of the damping unit due to an increase of a deflection amplitude of the platform by a quick raising of the damping degree.

15. The apparatus according to claim 1, wherein the adjustment unit comprises an electric actuator that adjusts a pre-bias force of a spring element.

16. The apparatus according to claim 1, wherein the sensor is a camera, via which the control unit receives the movement of the moveable platform, on the basis of a detection of markings at an underside of the moveable platform.

* * * * *